US012682192B2

(12) United States Patent
Howard et al.

(10) Patent No.: US 12,682,192 B2
(45) Date of Patent: Jul. 14, 2026

(54) FIXED RETAIL SCANNER WITH MULTI-PORT NETWORK SWITCH AND RELATED METHODS OF MANAGING ACCESS TO NETWORK DEVICES

(71) Applicant: Datalogic IP Tech S.R.L., BO (IT)

(72) Inventors: Brett Howard, Eugene, OR (US); Kyle Frischman, Eugene, OR (US)

(73) Assignee: Datalogic IP Tech S.r.l., Calderara di Reno (IT)

( * ) Notice: Subject to any disclaimer, the term of this patent is extended or adjusted under 35 U.S.C. 154(b) by 0 days.

(21) Appl. No.: 19/004,124

(22) Filed: Dec. 27, 2024

(65) Prior Publication Data

US 2026/0187393 A1 Jul. 2, 2026

(51) Int. Cl.
*G06K 7/10* (2006.01)
*G06Q 20/20* (2012.01)
*G07G 1/00* (2006.01)

(52) U.S. Cl.
CPC ....... *G06K 7/1096* (2013.01); *G06K 7/10722* (2013.01); *G06Q 20/208* (2013.01); *G07G 1/0045* (2013.01)

(58) Field of Classification Search
CPC ........................... G07G 1/0045; G06K 7/1096
USPC ........................................................ 235/440
See application file for complete search history.

(56) References Cited

U.S. PATENT DOCUMENTS

| | | | |
|---|---|---|---|
| 7,234,641 B2 | 6/2007 | Olmstead | |
| 7,634,802 B2 * | 12/2009 | Chiloyan | ............ H04W 12/084 |
| | | | 713/168 |

| | | |
|---|---|---|
| 8,233,040 B2 | 7/2012 | Patel et al. |
| 8,430,318 B2 | 4/2013 | Mcqueen et al. |
| 8,704,903 B2 | 4/2014 | Mcclellan |
| 8,740,086 B2 | 6/2014 | Handshaw et al. |
| 8,861,664 B2 | 10/2014 | Akkihal et al. |
| 9,004,359 B2 | 4/2015 | Shearin et al. |
| 9,048,847 B2 | 6/2015 | Mclaurin et al. |
| 9,305,198 B2 | 4/2016 | Thompson et al. |
| 9,413,418 B2 | 8/2016 | Bottazzi et al. |
| 9,870,498 B2 | 1/2018 | Reynolds et al. |
| 10,049,247 B2 | 8/2018 | Gao |
| 10,161,742 B2 | 12/2018 | Patel et al. |
| 10,248,896 B2 | 4/2019 | Gao et al. |
| 10,326,943 B2 | 6/2019 | Crooks et al. |

(Continued)

FOREIGN PATENT DOCUMENTS

| | | |
|---|---|---|
| DE | 19815149 A1 | 10/1999 |
| EP | 3 153 923 A1 | 4/2017 |

OTHER PUBLICATIONS

Datalogic Brochure, "Digimarc Barcode Feature Overview", Datalogic S.p.A., 2014-2019, Oct. 28, 2019, 2 pgs.

(Continued)

*Primary Examiner* — Toan C Ly

(74) *Attorney, Agent, or Firm* — Foley & Lardner LLP

(57) ABSTRACT

The disclosure includes a fixed retail scanner including a data reader having a multi-port network switch disposed within a housing of the data reader. The multi-port network switch is configured to be configurable to provide security features to the network, including method for locking ports of the switch to specific scanner accessories and other devices, creating virtual local area networks for the devices of the date reading system, and other locating features over the network.

20 Claims, 13 Drawing Sheets

(56)        References Cited

U.S. PATENT DOCUMENTS

| | | | |
|---|---|---|---|
| 11,080,498 | B1 | 8/2021 | Drzymala et al. |
| 11,151,344 | B2 | 10/2021 | Barkan et al. |
| 12,045,686 | B2 | 7/2024 | Howard et al. |
| 2003/0001010 | A1 | 1/2003 | Schmidt et al. |
| 2003/0078849 | A1 | 4/2003 | Snyder |
| 2008/0182639 | A1 | 7/2008 | Antonopoulos et al. |
| 2010/0139989 | A1 | 6/2010 | Atwater et al. |
| 2012/0181338 | A1 | 7/2012 | Gao |
| 2013/0020392 | A1 | 1/2013 | Olmstead et al. |
| 2013/0306727 | A1 | 11/2013 | Shearin et al. |
| 2013/0327829 | A1 | 12/2013 | Thompson et al. |
| 2014/0118920 | A1 | 5/2014 | Ng et al. |
| 2017/0037768 | A1 | 2/2017 | Fangauer |
| 2017/0140363 | A1 | 5/2017 | Hicks et al. |
| 2017/0154195 | A1 | 6/2017 | Nahill et al. |
| 2017/0374768 | A1 | 12/2017 | Hughes et al. |
| 2018/0218190 | A1 | 8/2018 | Nadabar |
| 2019/0369252 | A1 | 12/2019 | Girotti |
| 2020/0125812 | A1 | 4/2020 | Canini et al. |
| 2021/0142015 | A1 | 5/2021 | Drzymala et al. |
| 2022/0207969 | A1 | 6/2022 | Howard et al. |
| 2022/0232138 | A1 | 7/2022 | Gao et al. |
| 2023/0269843 | A1 | 8/2023 | Slowik et al. |

OTHER PUBLICATIONS

Datalogic Brochure, "Fixed Retail Scanners Product Group Guide", Datalogic S.p.A., 2021, Apr. 30, 2021, 8 pgs.

Datalogic Brochure, Magellan 9300i/9400i, Datalogic S.p.A., 2015-2019, Aug. 22, 2019, 2 pgs.

Datalogic Brochure, "Magellan 9800i Advanced Digital Imagine Technology for the Point of Sale", Datalogic S.p.A., 2012-2017, Mar. 21, 2017, 3 pgs.

Datalogic Brochure, "Magellan 9800i Premium bi-optic with market-leading performance for high-throughput scanning", Datalogic S.p. A., 2013-2021, Dec. 10, 2021, 2 pgs.

PCT International Foreign Search Report and Written Opinion for PCT/US2022/053712 dated Apr. 5, 2023, 11 pps.

Petkovic, "Software Synchronization of Projector and Camera for Structured Light 3D Body Scanning", Proceedings of the 7th International Conference on 3D Body Scanning Technologies, Lugano, Switzerland, Nov. 30-Dec. 1, 2016, 10 pages.

Product Spec Sheet, "Zebra MP7000 Scanner Scale", Zebra Technologies Corp., Nov. 11, 2019, 4 pgs.

* cited by examiner 116, 126

TO 140

112, 114, 122, 124

TO 130

152, 154, 156

TO 140

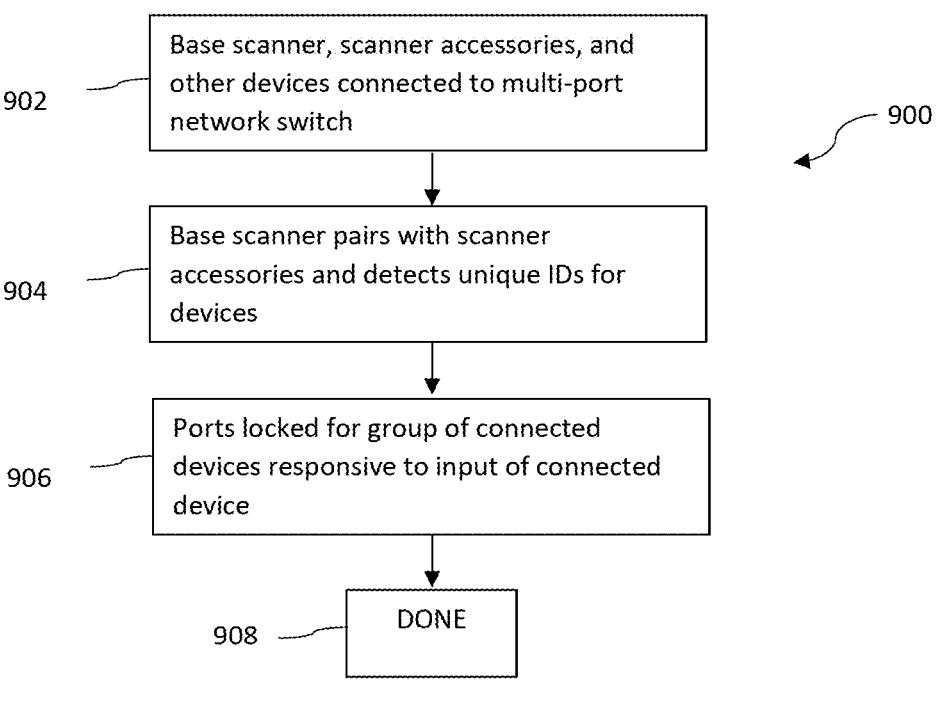

902    Base scanner, scanner accessories, and other devices connected to multi-port network switch 904    Base scanner pairs with scanner accessories and detects unique IDs for devices 906    Ports locked for group of connected devices responsive to input of connected device

908    DONE

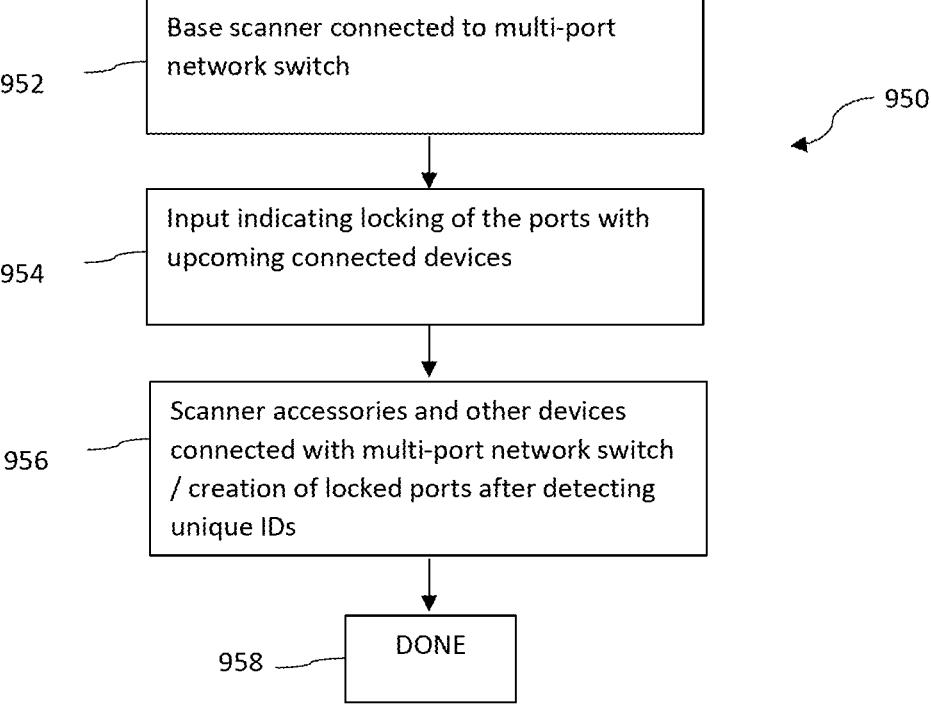

952    Base scanner connected to multi-port network switch

954    Input indicating locking of the ports with upcoming connected devices

956    Scanner accessories and other devices connected with multi-port network switch / creation of locked ports after detecting unique IDs

958    DONE

FIXED RETAIL SCANNER WITH MULTI-PORT NETWORK SWITCH AND RELATED METHODS OF MANAGING ACCESS TO NETWORK DEVICES

TECHNICAL FIELD

The present disclosure relates generally to scanners or code readers, and more particularly, to fixed retail scanners having a multi-port enabled switch.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner comprises a housing, a base scanner including one or more internal camera modules and a main board including one or more processors disposed within the housing, one or more scanner accessories, and a multi-port network switch. The multi-port network switch is operably coupled with the base scanner and the one or more scanner accessories, wherein the multi-port network switch is configured to configure access to the network responsive to a user input received by at least one of the base scanner or the one or more scanner accessories.

A method for configuring network access to a fixed retail scanner comprises connecting a base scanner to a multi-port network switch disposed with in a common housing of the fixed retail scanner, connecting one or more scanner accessories to the multi-port network switch, receiving a user input via at least one of the base scanner or the one or more scanner accessories, an configuring the multi-port network switch to manage access to the network for communication through the multi-port network switch responsive to the user input.

BRIEF DESCRIPTION OF THE DRAWINGS

FIGS. 9A-9B are flowcharts illustrating methods for configuring a data reading system with managing access of ports of the multi-port network switch to certain devices according to embodiments of the disclosure.

DETAILED DESCRIPTION

Figure 1:
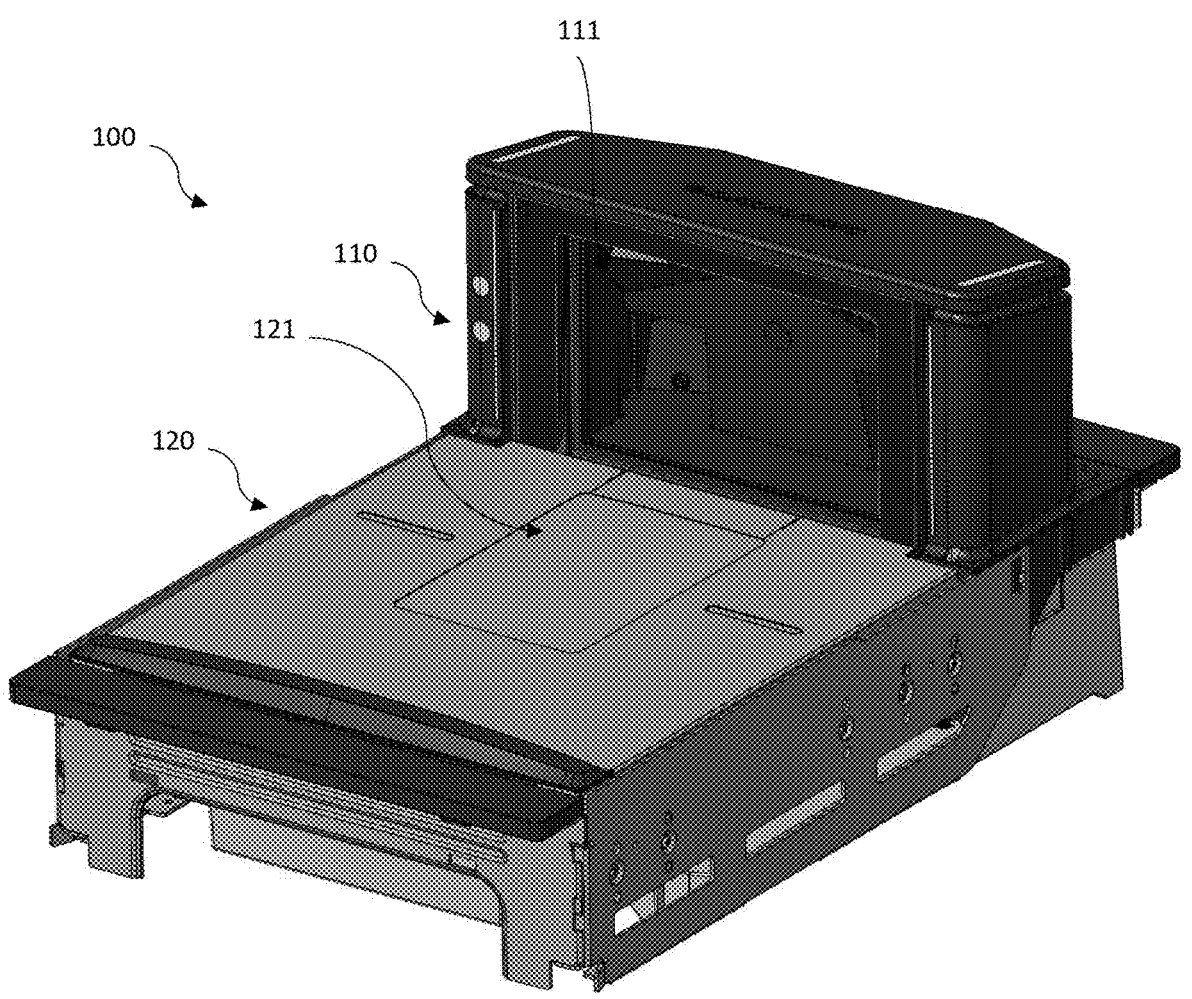
FIG. 1 is a perspective view of a data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

Figure 2:
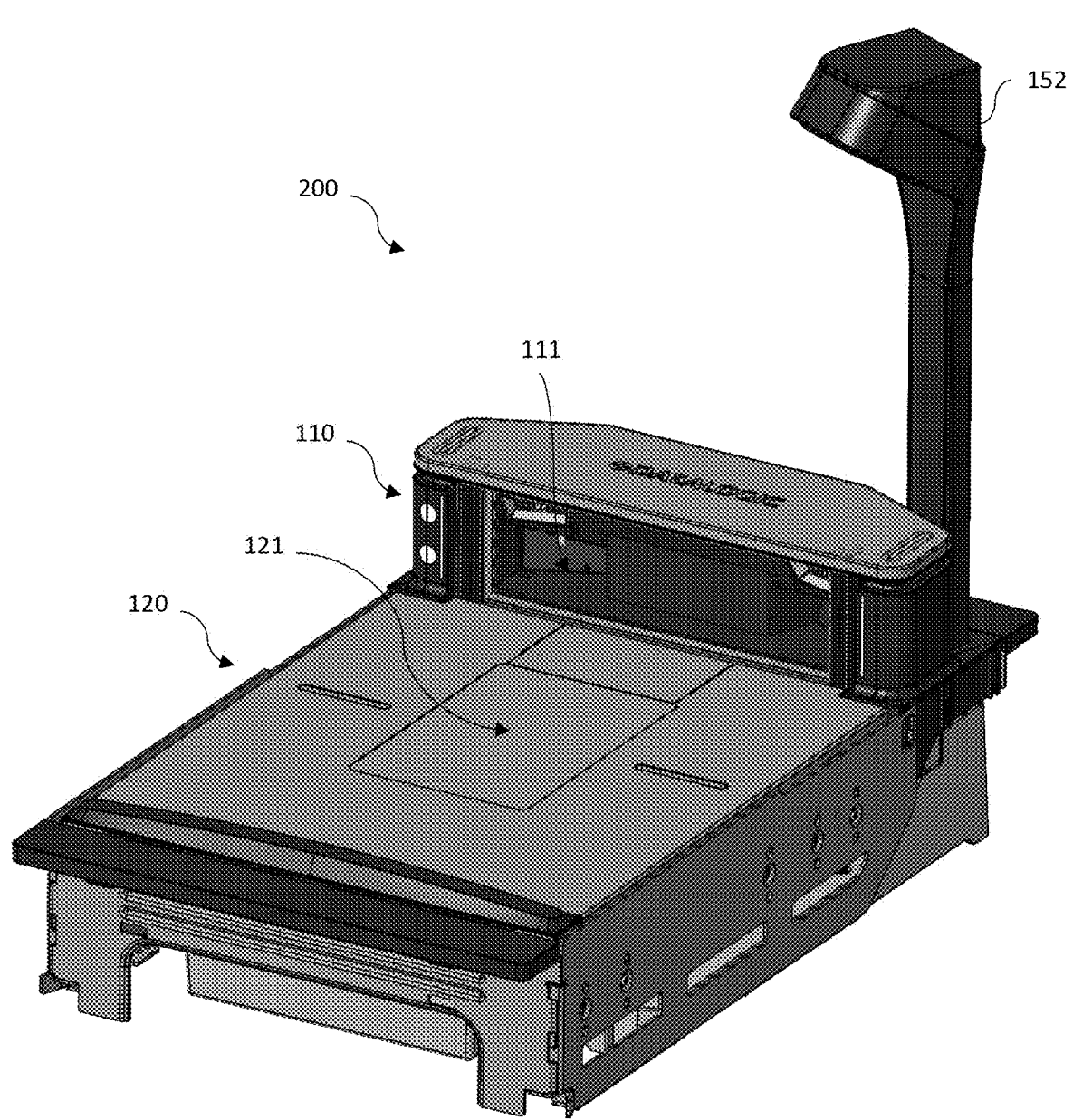
FIG. 2 is a perspective view of an illustrative data reader according to an embodiment of the disclosure.

FIG. 2 is a perspective view of an illustrative data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing 110 of FIG. 2 may have a lower profile bonnet compared to that of FIG. 1, which may result in internal cameras having a lower incidence angle. Thus, such a form factor may be particularly well suited to include the TDR 152 (FIG. 3) as an optional add-on to the data reader 200. However, a TDR 152 may also be coupled to the data reader 100 of FIG. 1 having the taller bonnet. Such a TDR may need to be taller to accommodate the taller bonnet. In addition, some embodiments may include additional TDRs, such as on the other side of the bonnet, to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER,"

U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READE," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
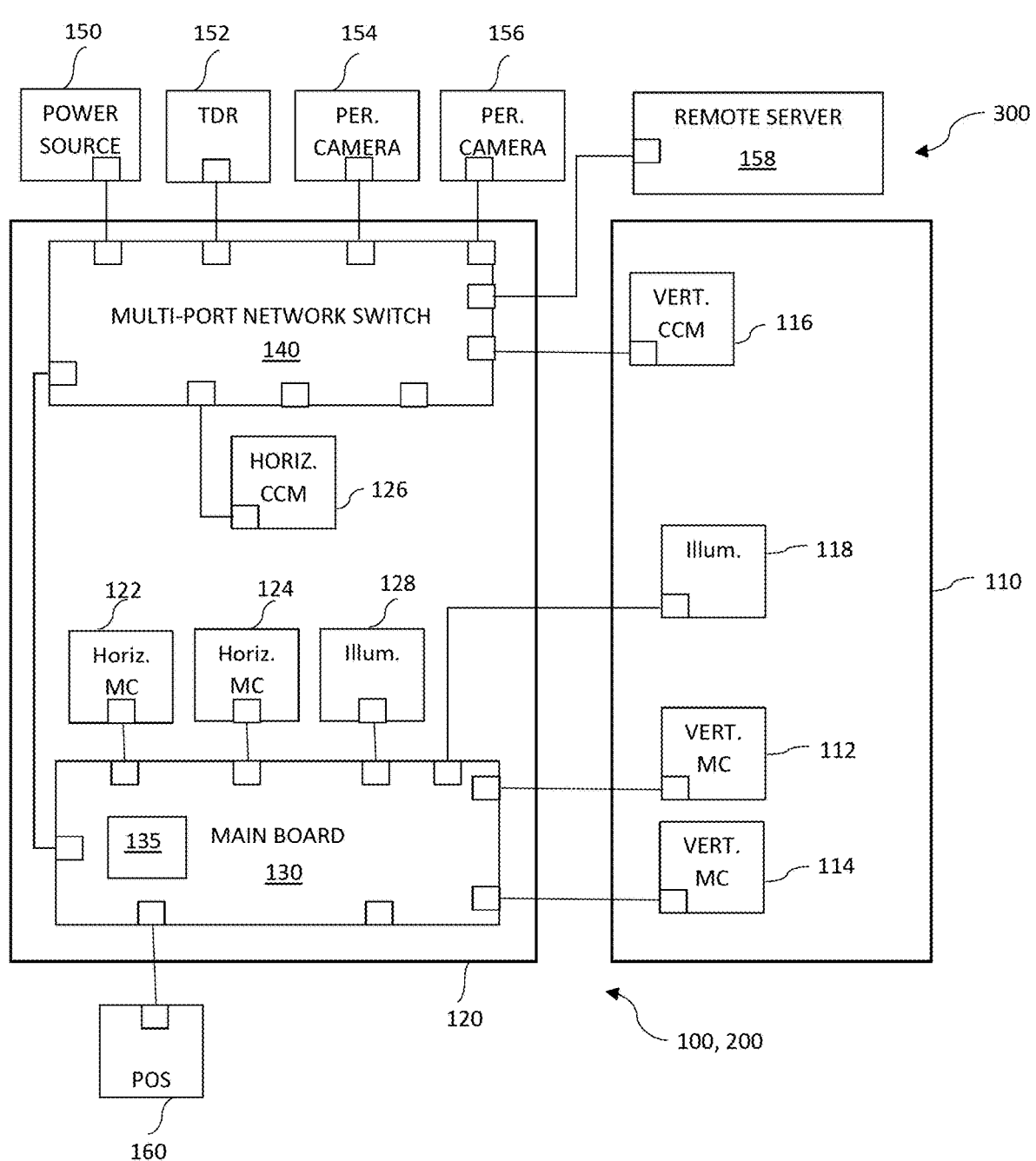
FIG. 3 is a simplified block diagram of an illustrative data reading system according to an embodiment of the disclosure.

FIG. 3 is a simplified block diagram of an illustrative data reading system 300 according to an embodiment of the disclosure. The data reading system 300 may include a data reader 100, 200 that may be operably coupled with one or more of a power source 150, the top-down reader (TDR) 152, peripheral cameras 154, 156, a remote service 158, or a point-of-sale (POS) system 160.

The data reader 100, 200 may be a bi-optic fixed retail scanner having a vertical housing 110 and a horizontal housing 120. The data reader 100, 200 may be installed in a retail environment (e.g., grocery store), which typically is disposed within a counter or other support structure of an assisted checkout lane or a self-checkout lane. The vertical housing 110 may include a structure that provides for one or more camera fields-of-view (through a vertical window) within a generally vertical plane across the read zone of the data reader 100, 200. The vertical structure provides an enclosure for one or more cameras 112, 114, 116, active illumination assemblies 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras 112, 114 may be configured to capture monochrome images through the vertical window of the data reader 100, 200. Likewise, horizontal monochrome cameras 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly useful in performing certain functions, such as produce recognition, item recognition or verification, and/or security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be generally oriented orthogonal to each other similar to the orientation of the windows or other angled arrangements (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the vertical monochrome imagers 112, 114 and the horizontal monochrome imagers 122, 124. These connections may be via a communication interface (e.g., a MIPI interface). The main board 130 may have decoding software embedded therein such that one or more on-board processors 135 may receive monochrome images to perform decoding on the optical indicia and provide the decoding result to a point-of-sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. Although a single block is shown representing one or more on-board processors 135, it is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or multi-port network switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 160 may be coupled directly to the main board 130. Such a connection may be via communication interfaces, such as USB, RS-232, or other such interfaces. In some embodiments, the POS 160 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch may include multiple ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products and/or devices configured to provide network synchronization and communication with multiple network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140 which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the color images internally within the data reader 100, 200 by the one or more processors 135 supported by the main board 130. In some embodiments, barcode decoding may also be performed on the color images internally within the data reader 100, 200 by the one or more processors 135 supported by the main board 130. Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources.

Image data from the monochrome cameras 112, 114, 122, 124 may be provided to the main board 130 to the processing/analysis modules located internal to the data reader 100, 200 such as the one or more processors 135 supported by the main board 130. As such, barcode decoding may also be performed on the color images internally within the data reader 100, 200 by the one or more processors 135 supported by the main board 130. In some embodiments, image analysis (e.g., AI, machine learning, OCR, object recognition, item validation, produce recognition, analytics, etc.) may be performed on the monochrome images internally within the data reader 100, 200 by the one or more processors 135 supported by the main board 130. Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reader 100, 200 by the one or more processors 135 supported by the main board 130. In some embodiments, barcode decoding may also be performed on such images internally within the data reader 100, 200 by the one or more processors 135 supported by the main board 130. Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (POE)) to the main board 130 and the color cameras 116, 126. Monochrome cameras 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

In some embodiments, the multi-port network switch 140 may be disposed within an external module having its own housing separate from the data reader 100. The multi-port network switch 140 may, thus, be located outside of the bioptic housing of the data reader 100 but may operably couple to the main board 130 and internal devices (e.g., vertical CCM 116, horizontal CCM 126) as well other external devices (e.g., TDR 152, cameras 154, 156, server 158, etc.) for providing the network backbone for communication and/or power as described above.

Figure 4:
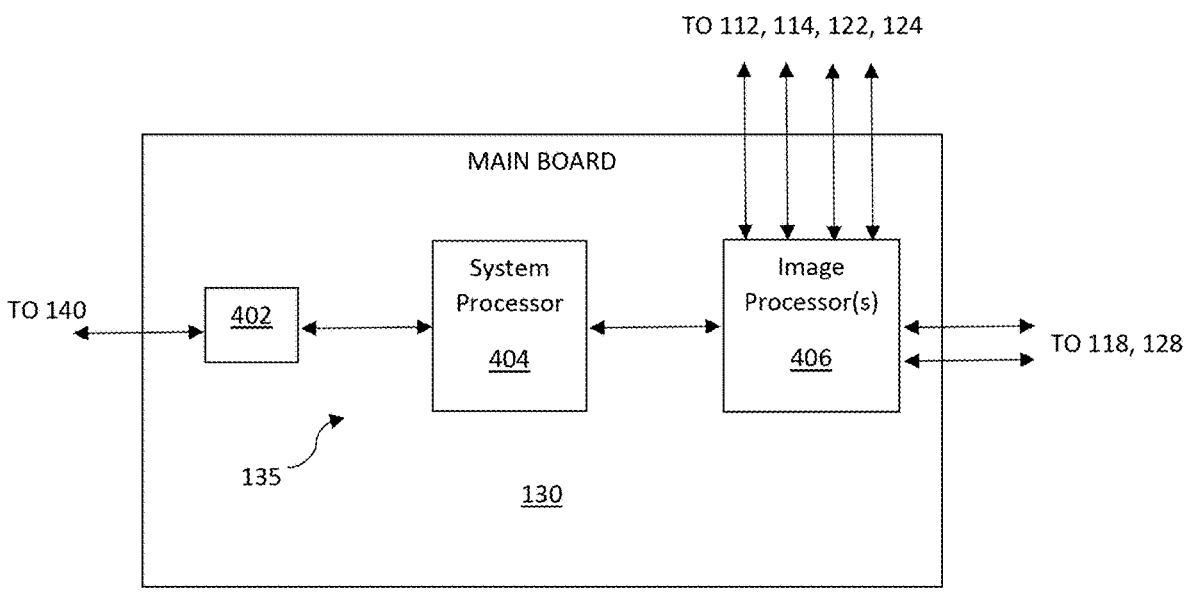
FIG. 4 is a simplified block diagram of certain components mounted on the main board according to an embodiment of the disclosure.

FIG. 4 is a simplified block diagram of certain components mounted on the main board 130 according to an embodiment of the disclosure. In particular, further details are provided regarding the one or more processors 135 that may include an Ethernet physical layer 402, a system processor 404, and an image processor 406. Additional processing elements are also contemplated among the one or more processors 135, such as, for example, an artificial intelligence (AI) accelerator disposed on the main board 130 and coupled to the system processor 404 (e.g., via insertion into a PCIe slot on the main board 130).

The system processor 404 may be coupled to each of the Ethernet physical layer 402 and the image processor 406. The Ethernet physical layer 402 may be coupled with the multi-port network switch 140 to provide an interface between the main board 130 and the multi-port network switch 140. The image processor 406 may be coupled to the monochrome imagers 112, 114, 122, 124 to provide control (e.g., sync signal) and to receive monochrome images therefrom. The image processor 406 may be configured to receive and format image data from the cameras 112, 114, 122, 124 before being received by the system processor 404. In some embodiments, multiple image processors may be present such that each camera 112, 114, 122, 124 may have its own image processor associated therewith. In some embodiments, cameras may share an image processor for transmission to the system processor 404. For example, a single image processor (e.g., FPGA) may be configured to combine (e.g., concatenate) the image data from each of the monochrome cameras 112, 114, 122, 124 for the system processor to receive multiple views at a single point in time through one input. An example of such a process is described in U.S. Patent Publication No. 2022/0207969, filed Dec. 31, 2020, and entitled "FIXED RETAIL SCANNER WITH ANNOTATED VIDEO AND RELATED METHODS," the disclosure of which is incorporated by reference in its entirety. Image processor 406 may also be coupled to the illumination assemblies 118, 128 to provide control thereto (e.g., sync signal). In some embodiments, the sync signal may be generated by one of the Ethernet physical layer 402 or the system processor 404, and which may be based on a system clock signal.

Figure 5:
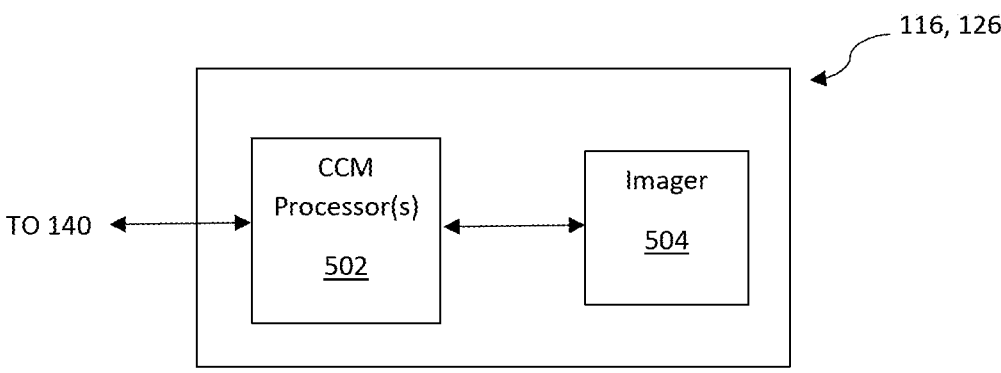
FIGS. 5-7 are different simplified block diagrams of the various imager modules according to an embodiment of the disclosure.
Figure 6:
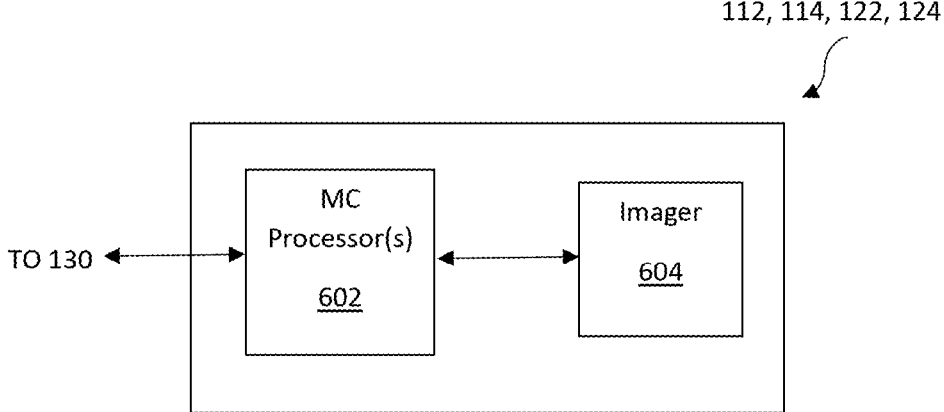
Figure 7:
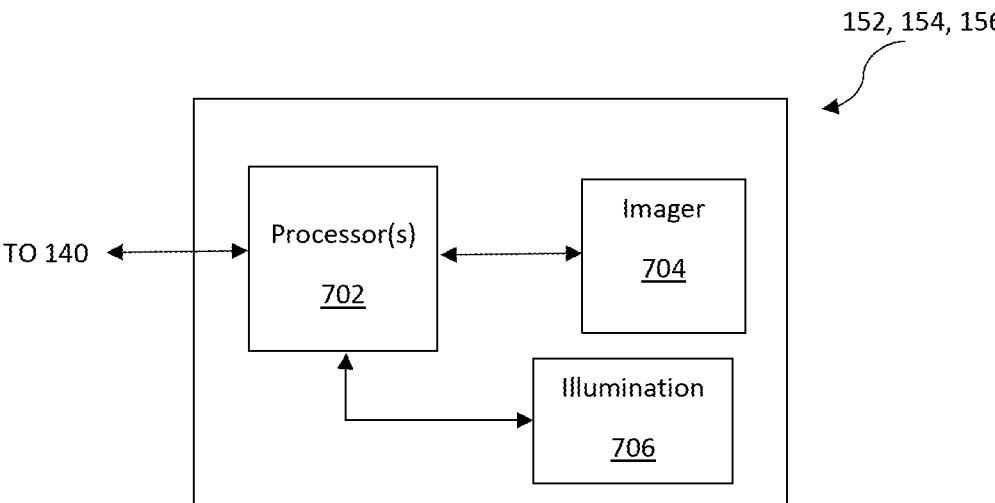

FIGS. 5-7 are different simplified block diagrams of the various imager modules according to an embodiment of the disclosure. For example, FIG. 5 may refer to one of the color camera modules 116, 126, FIG. 6 may refer to one of the monochrome camera (MC) modules 112, 114, 122, 124, and FIG. 7 may refer to one of the TDR 152 or peripheral cameras 154, 156 as examples.

Referring to FIG. 5, the color camera module (CCM) 116, 126 may include a CCM processor 502 that couples to a color imager 504 and to the multi-port network switch 140. The CCM processor 502 may include one or more processors that perform different functions, such as control, formatting, and/or certain analysis functionality, etc. Active illumination for the color camera module 116, 126 may occur off-board via separate illumination assemblies 118, 128. In some embodiments, separate on-board processors may not be present for one or more of the CCM modules 116, 126 such that the control for such may be directly from the main board (e.g., system processor 404) and/or via the multi-port network switch 140 rather than with its own CCM processor 502.

Referring to FIG. 6, the monochrome camera module 112, 114, 122, 124 may include a MC processor 602 that couples to a monochrome imager 504 and to the main board 130 directly. However, it is also contemplated that the monochrome imagers 504 may be connected to the multi-port network switch 140. The MC processor 602 may include one or more processors that perform different functions, such as control, formatting, and/or certain analysis functionality, etc. Active illumination for the MC camera module 112, 114, 122, 124 may occur off-board via separate illumination assemblies 118, 128. In some embodiments, separate on-board processors may not be present for one or more of the MC camera modules 112, 114, 122, 124 such that the control for such may be directly from the main board (e.g., system processor 404 and/or image processor 406) rather than its own MC processor 602.

Referring to FIG. 7, the TDR 152 or other peripheral cameras 154, 156 may include a processor 702 that couples to an imager 704 (e.g., color and/or monochrome depending on application) and to the multi-port network switch 140. The processor 702 may include one or more processors that perform different functions, such as control, formatting, and/or certain analysis functionality, etc. In some embodiments, certain camera modules (e.g., TDR 152 or other peripheral cameras 154, 156) may have their own active illumination assembly 706 associated therewith that may different than the illumination assemblies 118, 128 within the bioptic housing. The illumination assembly 706 may be located on-board as shown or may be provided at a separate location that may still be within the camera module housing. In some embodiments, separate on-board processors may not be present for the TDR 152 such that the control for such may be directly from the main board (e.g., system processor 404) and/or via multi-port network switch 140 rather than with its own TDR processor 702.

Additional details regarding examples of various arrangements and methods of operation (e.g., synchronization, control, etc.) are described in U.S. Pat. No. 12,045,686, issued Jul. 23, 2024, and entitled "FIXED RETAIL SCANNER WITH MULTI-PORT NETWORK SWITCH AND RELATED METHODS," the disclosure of which is incorporated by reference herein in its entirety.

Referring again to FIG. 3, each device connected to the multi-port network switch 140 may be assigned a unique identifier (e.g., MAC address) for use when communicating within the network. This assignment of unique identifiers to their respective devices may be stored in non-volatile memory of the device at the time of manufacturing the device. For example, the scanning system managed by the main board 130 (also referred to as the "base scanner") may be assigned a first unique ID, which may be used for communicating with the network via the multi-port network switch 140. Likewise, other devices connected to the multi-port network switch 140 may be assigned unique IDs. For example, the vertical CCM 116 may be assigned a second unique ID, horizontal CCM 126 may be assigned a third unique ID, TDR 152 may be assigned a fourth unique ID, first peripheral camera 154 may be assigned a fifth unique ID, second peripheral camera 156 may be assigned a sixth unique ID, and remote server 158 (e.g., of a local in-store network or a remote network) may be assigned a seventh unique ID. Of course, these are examples of connected devices. More or fewer internal and/or peripheral devices may be connected depending on the total number of supported or available ports of the multi-port network switch 140. As previously described, the POS 160 may be coupled directly to the multi-port network switch 140 if so enabled. As such, the POS 160 may also be assigned a unique ID, which may also be used for communicating within the network. The multi-port network switch 140 may learn these unique IDs of the connected device during the learning phase on a per port basis as described more fully below.

Introduction of a multi-port network switch 140 may introduce security concerns regarding communication between connected devices, particularly if a malicious device was connected, thereby providing access to control and/or data of the other devices. The multi-port network switch 140 may be configured to restrict access to devices determined not to be secure. Restricting access may include blocking all communications with the network in some instances, whereas other cases may include restricting communications to occur only between some devices (such as by creating a VLAN as described more fully below). In some embodiments, restricting access may include disallowing power over Ethernet (POE) on a per port basis if a device is connected that is not permitted for that port.

Figure 8A:
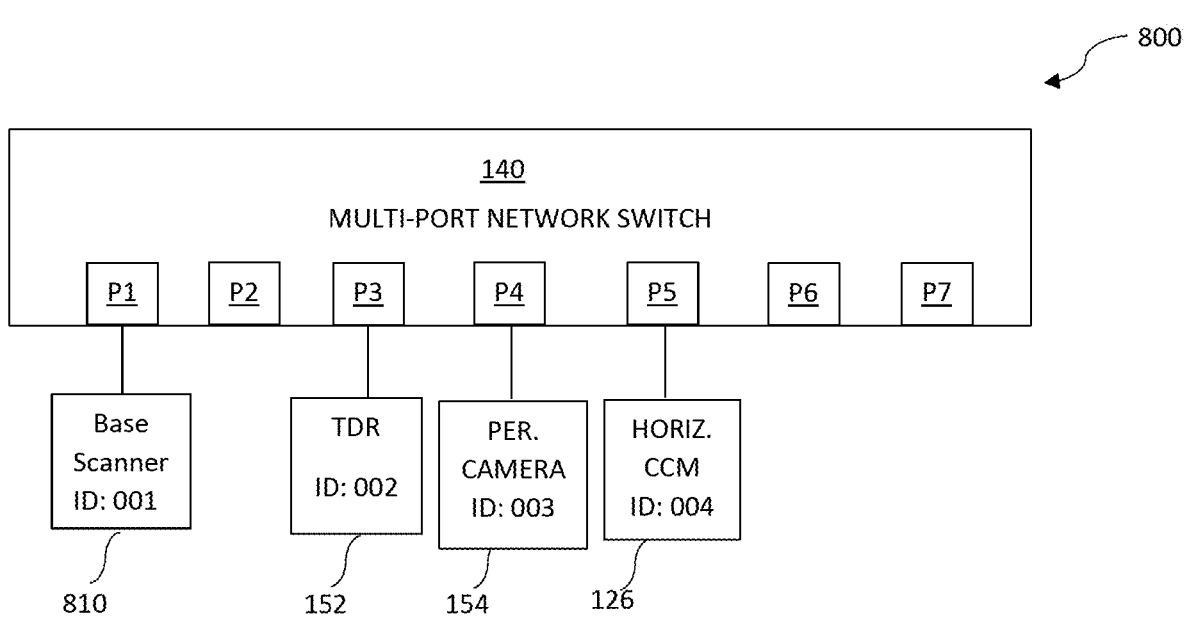
FIGS. 8A-8E are simplified block diagrams of an illustrative data reading system showing an example operational scenario according to an embodiment of the disclosure.

FIGS. 8A-8E are simplified block diagrams of an illustrative data reading system 800 showing an example operational scenario according to an embodiment of the disclosure. In this example, the multi-port network switch 140 may include ports P1-P7 that may be communicatively coupled to various devices of the data reading system 800. As shown in FIG. 8A, the multi-port network switch 140 may be communicatively coupled to the base scanner 810 via port P1, a TDR 152 via port P3, a peripheral camera 154 via port P4, and a horizontal CCM 126 via port P5. Other ports P2, P6, P7 may not be coupled to any devices. For example, for various reasons, a user may not desire to have other connected devices, such as a vertical CCM, multiple peripheral cameras, or a remote server that are described above.

The base scanner 810 may include a base scanning system supported by the main board described above, such as the Ethernet physical layer 402, a system processor 404, and an image processor 40 (FIG. 4) and other connected devices of the main board (e.g., monochrome cameras 112, 114, 122, 124). Also as discussed above, the multi-port network switch 140, the base scanner 810, and the horizontal CCM 126 may be housed within a common housing (e.g., a horizontal portion) of a fixed retail scanner (e.g., a bi-optic scanner having multiple planes/exit windows). Other configurations are also contemplated as described above, including a single plane scanner or other connected devices in various combinations. The example provided in FIGS. 8A-8E is intended to be one combination of devices for purposes of discussion rather than any limiting scenario.

In this example, FIG. 8A illustrates a learning phase, whereas FIGS. 8B-8E illustrate various situations that may occur while in the locked state. Referring to FIG. 8A, the multi-port network switch 140 may be configured to learn the unique IDs (e.g., MAC addresses) assigned to each device coupled to the ports during a learning phase. In the simplified example shown, the unique ID for the base scanner 810 may be "001," the unique ID for the TDR 152 may be "002," the unique ID for the peripheral camera 154 may be "003," and the unique ID for the horizontal CCM 126 may be "004." As a result, the permitted list for the multi-port network 140 switch may be as follows:

| | |
|---|---|
| PORT P1 | ID = 001 (BASE SCANNER) |
| PORT P2 | EMPTY |
| PORT P3 | ID = 002 (TDR) |
| PORT P4 | ID = 003 (PERIPHERAL CAMERA) |
| PORT P5 | ID = 004 (HORIZONTAL CCM) |
| PORT P6 | EMPTY |
| PORT P7 | EMPTY |

The learning phase may be initiated responsive to a user's input into the base scanner 810, such as by one or more of scanning a configuration barcode enabling the learning phase, a manual input, voice command, reading a text or image input, detecting a user gesture, detecting a biometric input, entering password or other protected input recognized by the base scanner 810 or other authorized device. During the learning phase, the multi-port network switch 140 may automatically detect all connected or communicatively coupled devices to learn the respective unique IDs of the connected devices. In some embodiments, the data reading system 800 may begin in the learning phase prior to installation and initial configuration to be an open and permissive state that allows for such learning to occur automatically with minimal manual intervention. In some embodiments, the multi-port network switch 140 may learn/permit multiple devices for a single port, thus allowing the flexibility of authorized devices to be connected through different ports if desired. For example, the TDR may be learned for both ports P3 and P4, which may permit the technician to connect the TDR to either port P3 or P4. Such learning may be performed in multiple stages of the learning process. In some embodiments, the multi-port network switch 140 may permit multiple devices to communicate via a single port during a single stage of the learning process. For example, another (e.g., external) multi-port network switch may be connected to port P3 with the another multi-port network switch having multiple devices connected thereto (e.g., TDR, peripheral camera, horizontal CCM). During the learning phase, the multi-port network switch 140 may learn unique IDs for each of these three devices in connection with port P3 such that any of them may be permitted to later be connected to port P3 after the locking phase.

Once the user (e.g., technician) is satisfied with the present configuration of the data reading system 800, the user may initiate a locked mode that locks in the IDs that are permitted to communicate with the network. As a result, any connected device that is not recognized may be denied access to the network and may not be permitted to communicate with the other devices of the data reading system 800. The locked mode may be initiated responsive to a user's input, such as by scanning a configuration barcode enabling the locked mode (ending the learning phase), or other input as described by the learning phase. In some embodiments, the locked mode may occur automatically following the learning phase being initiated and the unique IDs being identified for each port. In some embodiments, the base scanner 810 may transmit a command to the multi-port network switch 140 to enter the locked mode.

Figure 8B:
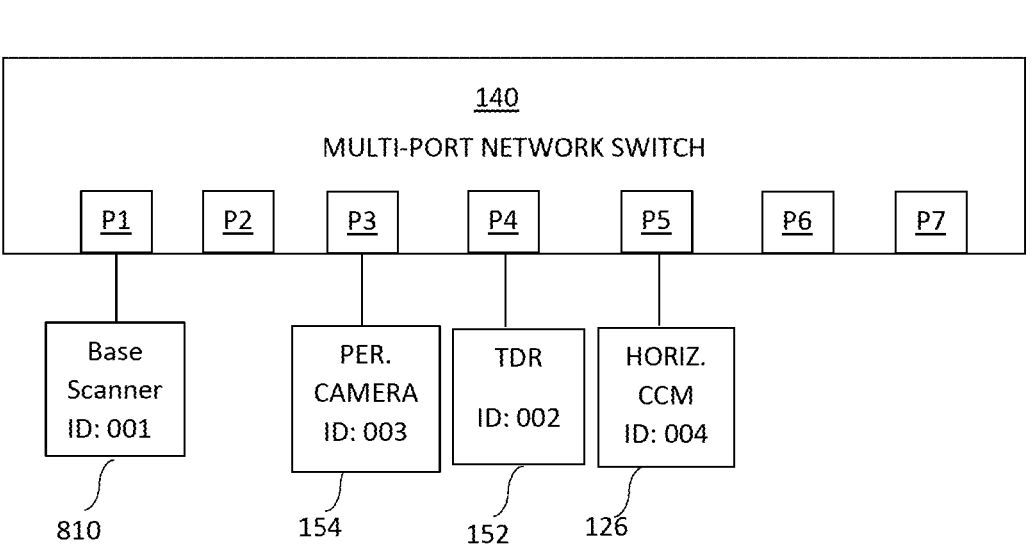

The locked state may also be on a per port basis such that even devices that may be recognized may not be permitted when connected to other ports that were not the port used during the learning phase. FIG. 8B illustrates this situation in which the TDR 152 and the peripheral camera 154 have switched ports. The peripheral camera 154 has been connected to port P3, and the TDR has been connected to port P4. Because these ports were not the ones used by the respective device during the learning phase, the multi-port network switch 140 may deny such access during operation. Only if a technician re-opens the learning phase to reconfigure the devices may this change be permitted. In some embodiments, the base scanner 810 may transmit a command to the multi-port network switch 140 to re-enter the learning phase.

Figure 8C:
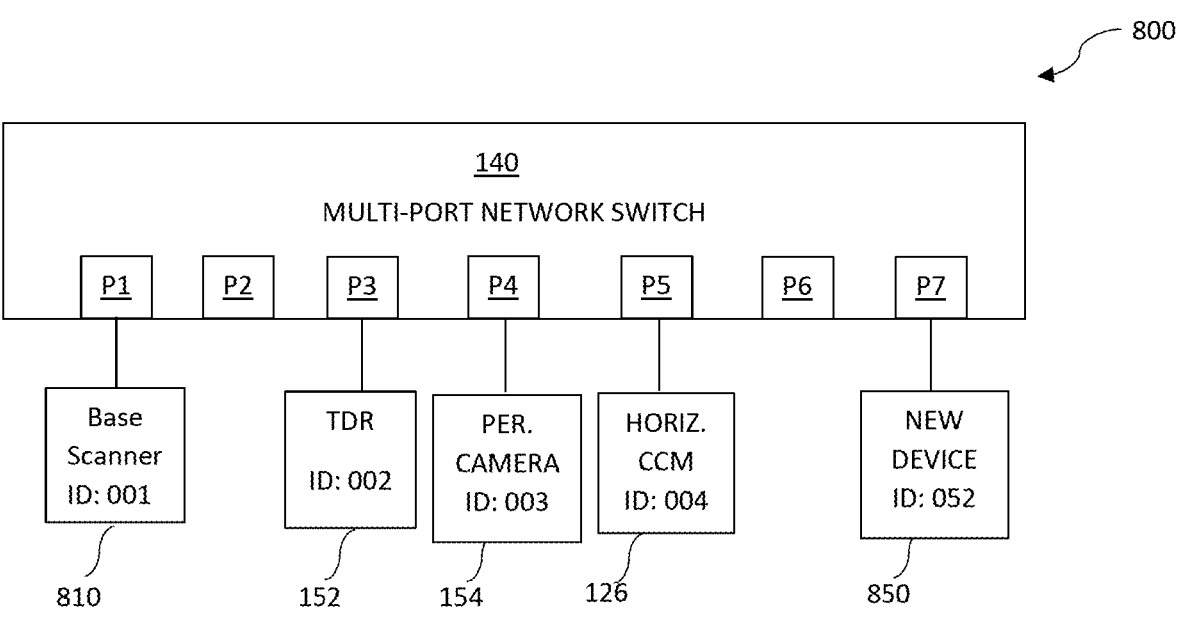

FIG. 8C illustrates a situation in which a new device 850 (e.g., a laptop) having a unique ID "052" may be connected to the multi-port network switch 140 via port P7. Because the data reading system 800 is in the locked state, the new unique ID showing up on a port that was not previously learned by the multi-port network switch 140, access to communicate with the system 800 by the new device 850 will be denied. Thus, the network may be protected from malicious users who attempt to plug into the multi-port network switch 140 to gain access to the customer's network.

Figure 8D:
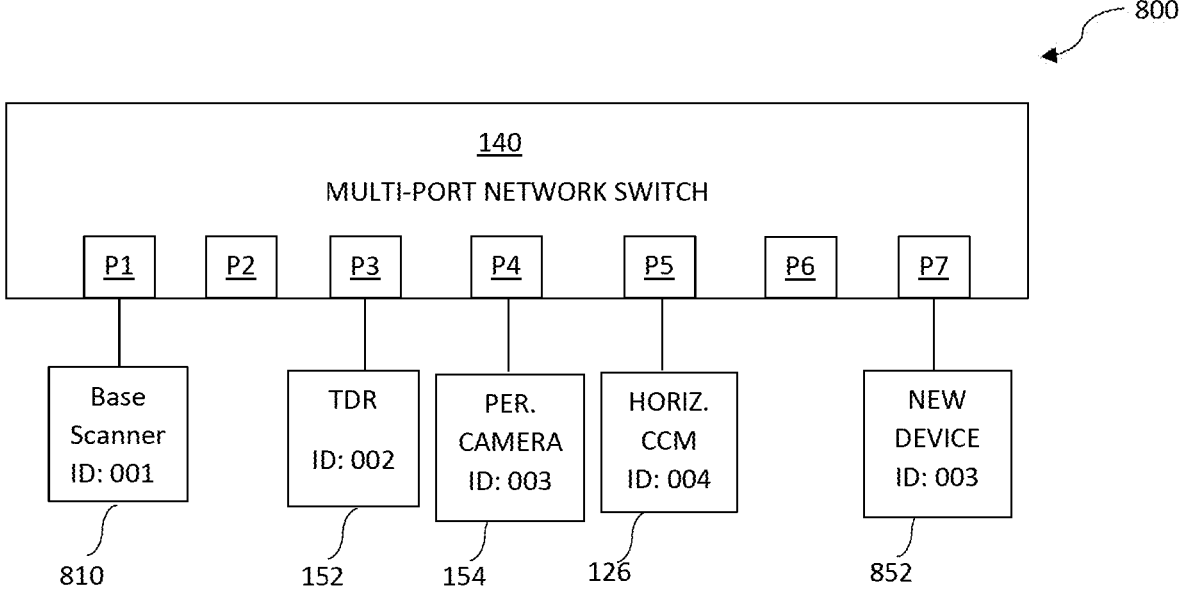

FIG. 8D illustrates a situation in which a new device 852 (e.g., a laptop) having a unique ID may be connected to the multi-port network switch 140 via port P7. In this case, the "unique" ID may have been spoofed and in this case is the same as the peripheral camera (ID: 003). However, because the data reading system 800 is in the locked state, the new unique ID showing up on a port has not previously learned by the multi-port network switch 140, access to communicate with the system will be denied. Thus, the network may be protected from malicious users who attempt to plug into the multi-port network switch 140 to gain access to the customer's network.

Figure 8E:
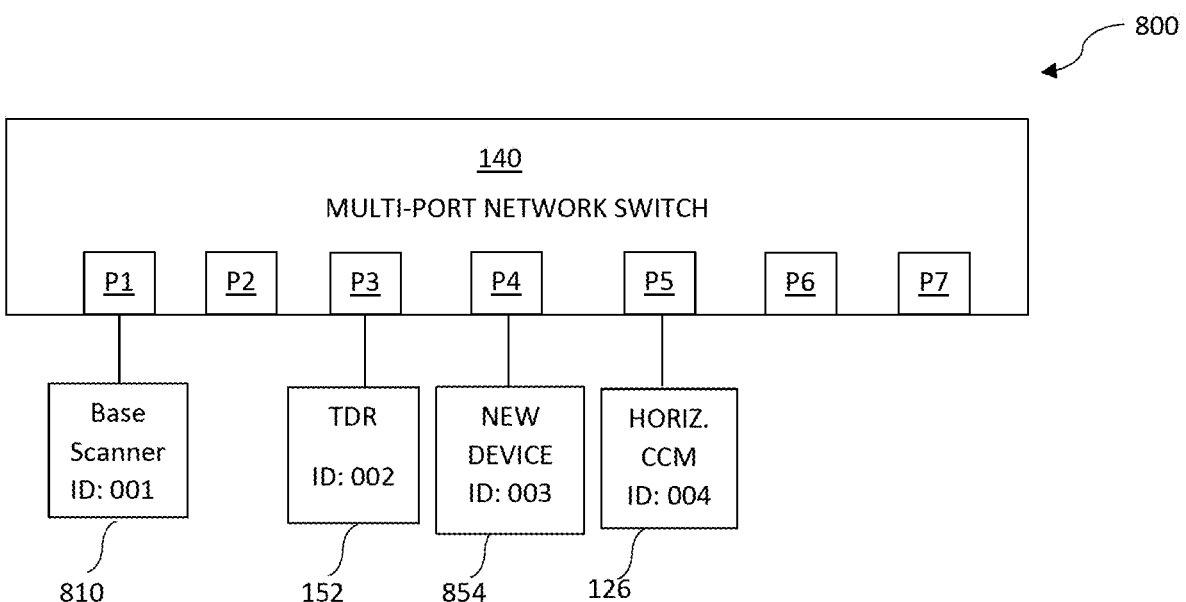

FIG. 8E illustrates a situation in which a new device 852 (e.g., a laptop) having a unique ID may be connected to the multi-port network switch 140 via port P4. In this case, a malicious user may have removed the peripheral camera 154 and replaced it with the new device 852. In this case, the "unique" ID may also have been spoofed to be same as the peripheral camera (ID: 003), with it also being coupled to the proper port P4.

Additional security measures may be present to protect the network from malicious users in this situation who attempt to plug into the multi-port network switch 140 to gain access to the customer's network. Because the base scanner 810 maintains a pairing list of connected devices (e.g., stored in non-transitory memory and optionally managed by at least one processor), the base scanner 810 may detect that a different device is connected due to the different behavior of the new device 852 compared to the expected behavior and/or communication (e.g., with an encryption certificate) with the peripheral camera 154. For example, messages may be exchanged and if an encryption certificate does not match as would be the case with the known peripheral camera 154, then the base scanner 140 may determine that a spoofed device is present. In this situation, the base scanner 140 may transmit a command to the multi-port network switch 140 to deny access to the device connected to the port. In some embodiments, the multi-port network switch 140 and/or base scanner 810 may detect a connected device being disconnected during the locked state. In response, thereto, an alert to personnel may be initiated to investigate the situation during which time communication on the port may be automatically disabled. In some embodiments, a threshold time for disconnection may be set to accommodate a normal loss of connection that is not of concern.

FIG. 9A is a flowchart illustrating a method for configuring a data reading system with managing access of ports of the multi-port network switch to certain devices according to an embodiment of the disclosure.

At operation 902, the base scanner, scanner accessories, and other devices are connected (e.g., cables plugged in) to the multi-port network switch. It should be understood wireless connections may also be utilized. The data reading system may begin in this learning phase prior to installation and initial configuration to be an open and permissive state that allows for such learning to occur automatically with minimal manual intervention. At operation 904, the base scanner may pair to the scanner accessories and begin learning the unique IDs (e.g., MAC addresses) for each of the connected devices.

At operation 906, the user may initiate the locked state for the group through an input to a connected device, such as by presenting a configuration barcode to be read by the base scanner. The base scanner may transmit the instructions to the multi-port network switch to lock the ports according to the unique IDs for the devices currently connected to their particular ports. As a result, future access to the network is restricted to only those devices currently connected to the specific ports, and the learning phase ends at operation 908.

FIG. 9B is a flowchart illustrating a method for configuring a data reading system with managing access of ports of the multi-port network switch to certain devices according to an embodiment of the disclosure.

At operation 952, the base scanner may be connected (e.g., cable plugged in) to the multi-port network switch. The data reading system may begin in this learning phase prior to installation and initial configuration to be an open and permissive state that allows for such learning to occur automatically with minimal manual intervention. At operation 954, the user may initiate the locked state for the group through an input to base scanner, such as by presenting a configuration barcode to be read by the base scanner. The actual locking of the ports of the multi-port network switch may occur after connecting the group of devices after a subsequent powerup.

At operation 956, the scanner accessories and other devices may be connected to the multi-port network switch. The base scanner may pair to the scanner accessories and begin learning the unique IDs (e.g., MAC addresses) for each of the connected devices. The base scanner may transmit the instructions to the multi-port network switch to lock the ports according to the unique IDs for the devices currently connected to their particular ports. As a result, future access to the network is restricted to only those devices currently connected to the specific ports and the learning phase ends at operation 958.

In either method of FIGS. 9A, 9B, locking the ports of the multi-port network switch to particular devices may be performed responsive to inputs received by the base scanner. A difference in the methods above is that for FIG. 9A the input (e.g., configuration barcode) to the base scanner may occur after new devices are connected, whereas for FIG. 9B the input (e.g., configuration barcode) to the base scanner may occur before the devices are connected to the multi-port network switch.

In some embodiments, the multi-port network switch 140 may create virtual local area networks (VLANs) to segment connected hardware devices and create network level isolation of the devices. For example, the base scanner 810 and other connected peripherals may be separated from the in-store network or other devices connected through the multi-port network switch, such as a POS system, a credit card reader, a printer, or other permissible device that is connected but for which communications are desired to be segmented. For example, in some embodiments, it may be desirable for the base scanner 810 may be isolated to just known accessories related to the scanning function (e.g., TDR, peripheral cameras) and being sandboxed from the outside world of other devices such as the remote server, POS device, credit card reader, etc. to provide additional network security to those devices.

Figure 10A:
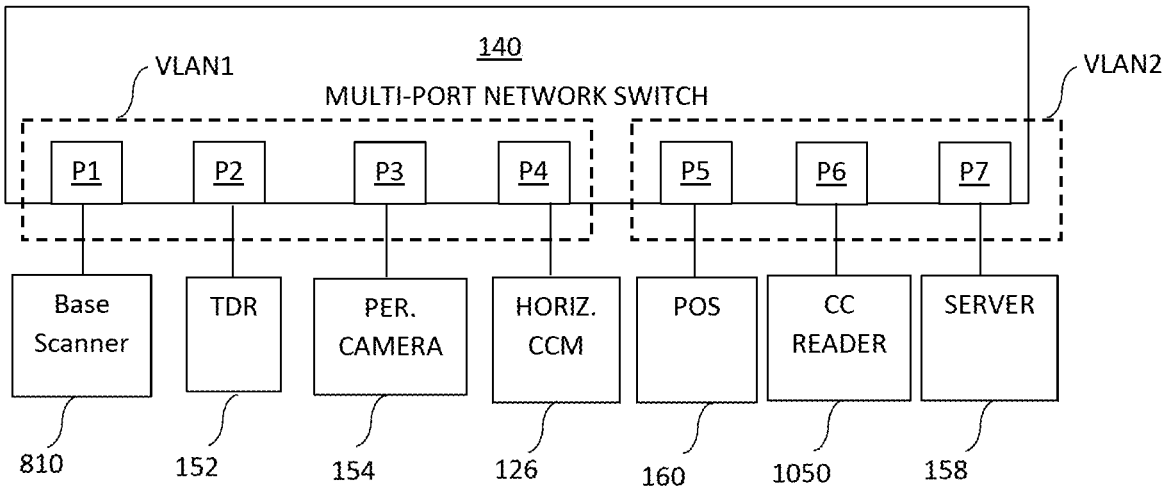
FIGS. 10A-10B are simplified block diagrams of an illustrative data reading system showing different examples of VLAN creation scenarios according to an embodiment of the disclosure.
Figure 10B:
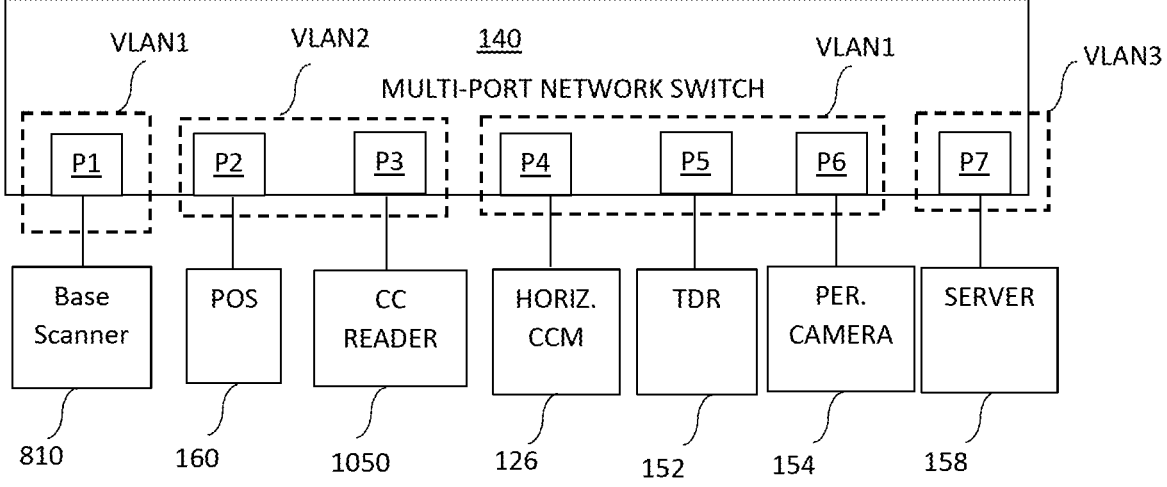

FIGS. 10A-10B are simplified block diagrams of an illustrative data reading system showing different examples of VLAN creation scenarios according to an embodiment of the disclosure. FIG. 10A shows an example in which VLAN creation is fixed for different ports of the data reading system. FIG. 10B shows an example in which VLAN creation is dynamic during a configuration routine by the user. In these examples, the multi-port network switch 140 may include ports P1-P7 that may be coupled to various devices of the data reading system.

As shown in FIG. 10A, the multi-port network switch 140 may be coupled to the base scanner 810 via port P1, a TDR 152 via port P2, a peripheral camera 154 via port P3, a horizontal CCM 126 via port P4, a POS device 160 via port P5, a credit card reader 1050 via port P6, and a server 158 via port P7. The server 158 may be a remote server in some embodiments, whereas the server 158 may be a local server (e.g., store intranet) in other embodiments.

The multi-port network switch 140 may be configured to create multiple VLANs for different ports for managing communication of the connected devices. In some embodiments, the VLANs may be fixed or static as defined by configuration for the device by grouping particular ports for the VLANs. As an example, the base scanner 810 may read a configuration barcode indicating which ports are to be grouped together for a first VLAN (ports P1-P4 shown in FIG. 10A), and which ports are to be groups together for additional VLANs (ports P5-P7 shown in FIG. 10A). Different configuration barcodes may be used depending on the desired combination. The base scanner 810 reads the barcode or other input indicating the specific VLAN arrangement and transmit the configuration command to the multi-port network switch 140 to create the desired VLAN groupings.

Figure 11A:
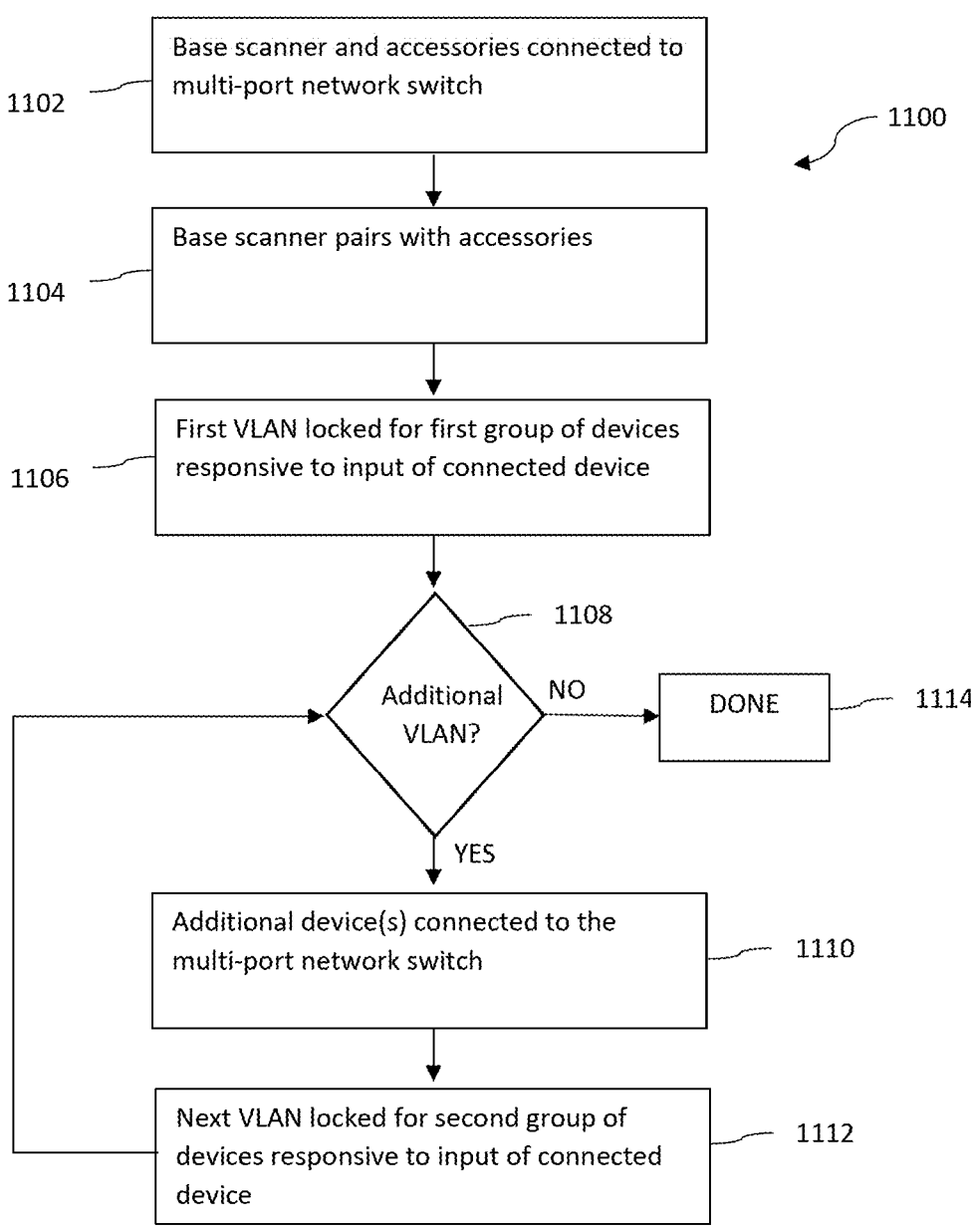
FIGS. 11A-11B are flowcharts illustrating methods for configuring a data reading system with one or more virtual local area networks according to embodiments of the disclosure.
Figure 11B:
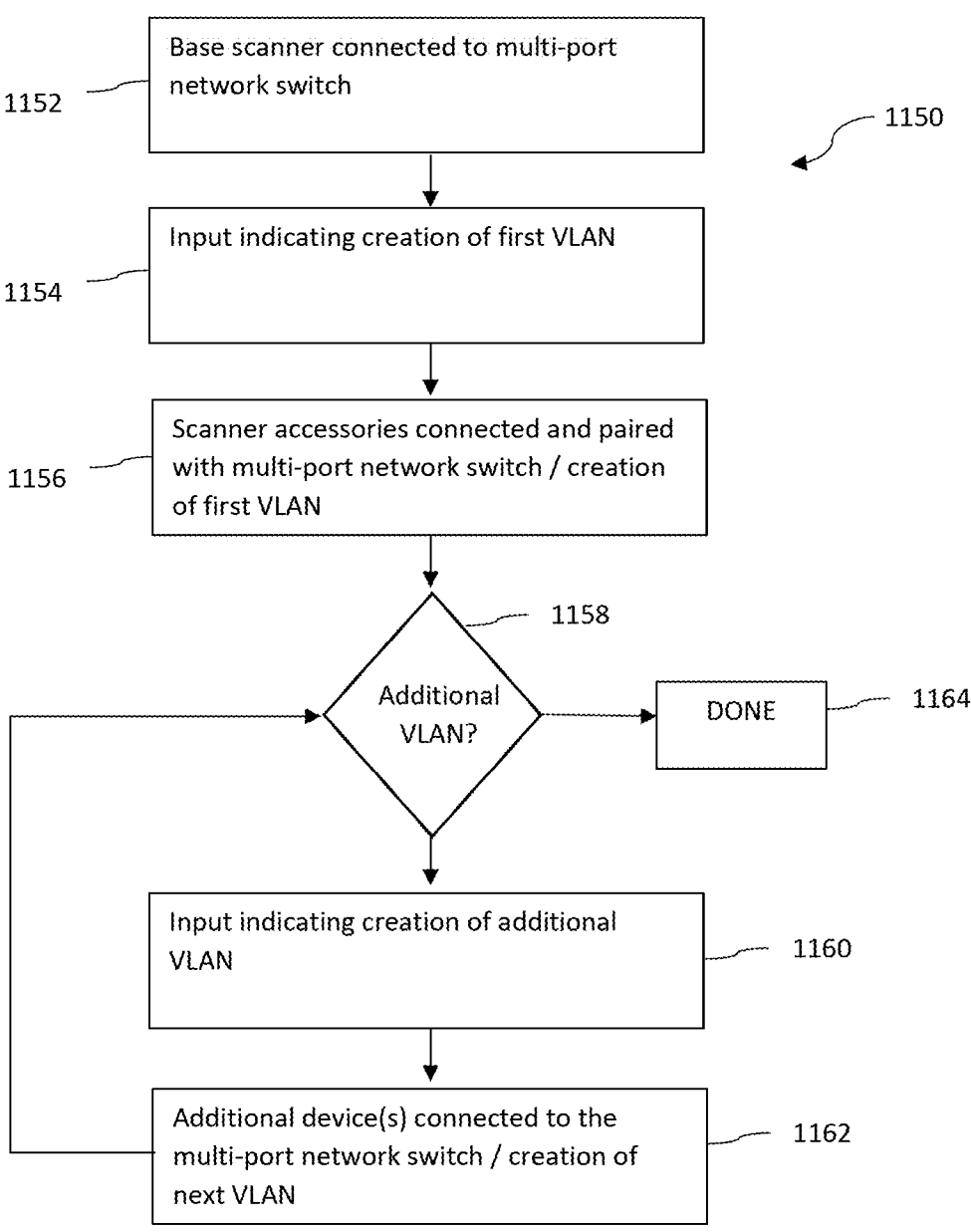

In some embodiments, the VLANs may be dynamically set by the user through a more flexible process in which the user connects the devices for each VLAN group in whatever port is desired for use, and the base scanner learns the location through the dynamic process. This iterative process may be more flexible allowing the user to define any desired grouping rather than relying only on those available by the specific configuration barcodes of the static configuration method. FIGS. 11A-11B provide example methods for this dynamic process for creating VLANs.

FIG. 11A is a flowchart 1100 illustrating a method for configuring a data reading system with one or more virtual local area networks according to an embodiment of the disclosure. At operation 1102, the base scanner and any scanner accessories may be connected (e.g., cables plugged in) to the multi-port network switch. Scanner accessories may include devices typically used in the scanning process such as a TDR, a peripheral camera, a vertical CCM, a horizontal CCM, or any combinations thereof as described above. At operation 1104, base scanner may pair with the scanner accessories to communicate therewith. In some embodiments, the pairing may be assisted by manual actions, such as the scanning of configuration barcodes, while in other embodiments the pairing may be achieved automatically through various methods of detection by the base scanner.

At operation 1106, the first VLAN may be created (i.e., locked) for the first group of devices responsive to an input to one of the connected devices. For example, the barcode scanner may read a configuration barcode instructing the scanner to inform the multi-port network switch to create the first VLAN for the first set of devices. In some embodiments, locking the VLAN may be initiated responsive to other input methods to the base scanner or other connected devices, such as a manual input (e.g., button selection), voice command, reading a text or image input, detecting a user gesture, detecting a biometric input, entering password or other protected input recognized by the base scanner or other authorized device.

At operation 1108, it may be determined if additional VLANs are desired to be created. If so, the method may continue to operations 1110, 1112. If not, the method ends at operation 1114. To stop the VLAN setup, the user may provide an input such as a different configuration barcode (or other form) ending the process. In some embodiments, a timeout may be achieved without any action resulting in the VLAN setup process ending. The timeout period may be long enough to reasonably allow the technician or user to connect additional devices and continue the VLAN setup process.

At operation 1110, additional devices may be connected to the multi-port network switch that are desired to be grouped in a second VLAN. An example of such a group may include the POS device and credit card reader (as in the example of FIG. 10B), but any device or combination of devices is contemplated.

At operation 1112, the second VLAN may be created (i.e., locked) for the second group of devices responsive to an input to one of the connected devices. For example, the barcode scanner may read a configuration barcode instructing the scanner to inform the multi-port network switch to create the second VLAN for the second set of devices (or other inputs as described above). In some embodiments, the configuration barcode initiating the first VLAN and the second VLAN may be the same barcode with the base scanner and/or multi-port network switch identifying the different devices connected during this second period in order to inform the determine which devices (ports) should be grouped for this new VLAN. The method may continue for creating additional VLANs (e.g., for a remote server, local server, an RFID reader, etc.) as desired.

FIG. 11B is a flowchart 1150 illustrating a method for configuring a data reading system with one or more virtual local area networks according to an embodiment of the disclosure. At operation 1152, the base scanner may be connected (e.g., cable plugged in) to the multi-port network switch.

At operation 1154, an input may be received indicating the creation of the first VLAN. For example, the barcode scanner may read a configuration barcode (or other input method) instructing the scanner to inform the multi-port network switch to create the first VLAN for the first set of devices. In this embodiment, the actual creation (i.e., locking) of the first VLAN occurs after connecting the group of devices and detecting which devices are newly connected after a subsequent powerup.

At operation 1156, the scanner accessories are connected and the base scanner is powered up, which detects the newly connected devices. Because of the prior input indicating these newly connected devices are to be grouped in the first VLAN, the base scanner informs the multi-port network switch which devices (ports) should be grouped for this new VLAN. As a result, the newly created VLAN may be created and locked. During this time, the scanner accessories may be paired to the base scanner.

At operation 1158, it may be determined if additional VLANs are desired to be created. If so, the method may continue to operations 1160, 1162. If not, the method ends at operation 1164. To stop the VLAN setup, the user may provide an input, such as a different configuration barcode (or other form) ending the process. In some embodiments, a timeout may be achieved without any action resulting in the VLAN setup process ending. The timeout period may be long enough to reasonably allow the technician or user to connect additional devices and continue the VLAN setup process.

At operation 1160, an input may be received indicating the creation of the second VLAN. For example, the barcode scanner may read a configuration barcode (or other input method) instructing the scanner to inform the multi-port network switch to create the second VLAN for the second set of devices. In this embodiment, the actual creation (i.e., locking) of the second VLAN occurs after connecting the group of devices and detecting which devices are newly connected after a subsequent powerup.

At operation 1162, additional devices may be connected to the multi-port network switch that are desired to be grouped in a second VLAN and the base scanner is powered up, which detects the newly connected devices. Because of the prior input indicating these newly connected devices are to be grouped in the second VLAN, the base scanner informs the multi-port network switch which devices (ports) should be grouped for this new VLAN. As a result, the newly created VLAN may be created and locked. The method may continue for creating additional VLANs as desired.

In either method of FIGS. 11A, 11B, VLANs for different connected devices (ports of the multi-port network switch) may be created for one or more different devices and/or groups of devices responsive to inputs received by the base scanner. A difference in the methods above is that for FIG. 11A the input (e.g., configuration barcode) to the base scanner may occur after new devices are added, whereas for FIG. 11B the input (e.g., configuration barcode) to the base scanner may occur before new devices are added.

In some embodiments, the base scanner and/or other devices of the data reading system may be configured to provide feedback to the user regarding the VLAN configurations that were sent up. For example, the user may provide an input (e.g., via a configuration barcode) requesting confirmation from the data reading system of which devices or ports are grouped together for a particular VLAN. In some embodiments, the base scanner and/or multi-port network switch may transmit a message to a connected display (e.g., a POS system, mobile device of the user, etc.) to list the grouped devices or ports for each VLAN. In some embodiments, various features of the base scanner, such as illumination patterns, audible messages, etc. may inform the user of which devices or ports are grouped together in a particular VLAN. Some base scanners may include internal display devices, such as a seven-segment display in which different numbers or codes may be communicated to a user or technician. Feedback regarding the VLAN configurations may be provided via the seven-segment display in response to a request. A base scanner having a seven-segment display or other display for displaying such messages is described by U.S. patent Ser. No. 18/513,123, filed Nov. 17, 2023, and entitled "Systems and Methods for Reporting Diagnostic Information in a Data Reading System," the disclosure of which is incorporated by reference in its entirety.

As an example feedback operation, a user may scan a configuration barcode requesting VLAN configuration feedback and may display a first set of numbers (e.g., 1, 4, 5, 6) indicating which ports of the multi-port network switch are grouped in the first VLAN, and then a second set of numbers (e.g., 2, 3) indicating which ports of the multi-port network switch are grouped in the second VLAN, and then a third set of numbers (e.g., 7) indicating which ports of the multi-port network switch are grouped in the third VLAN.

Figure 12:
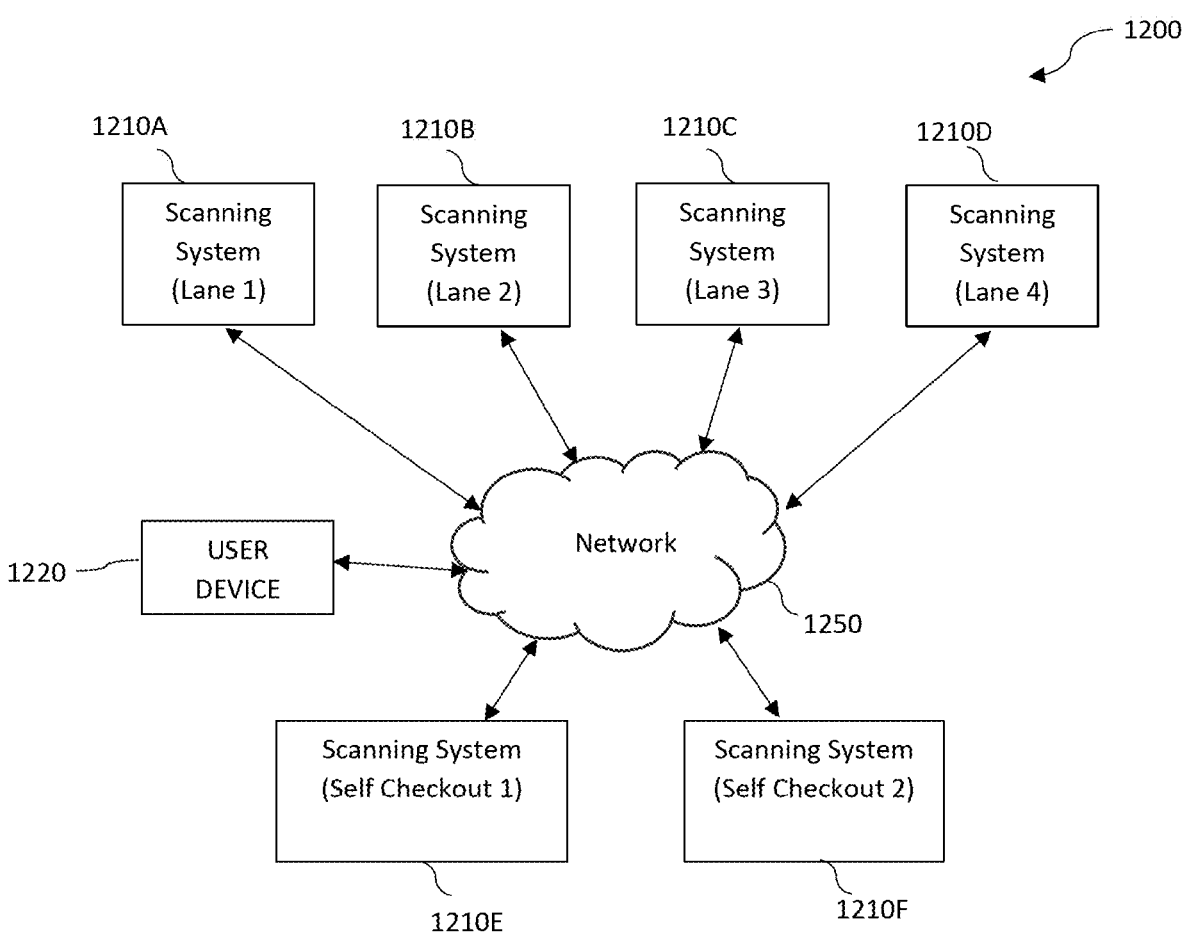
FIG. 12 is a simplified block diagram of a retail location that includes multiple scanners throughout the store.

Embodiments of the disclosure may also provide a method to distinguish a specific fixed retail scanner or a group of scanners within a sub-network among other installed units. For example, some locations (e.g., supermarkets) may have multiple data reading systems (including base scanners, accessories, etc.) that are coupled to a common network. For example, FIG. 12 is a simplified block diagram of a retail location 1200 (e.g., supermarket) that includes multiple scanners 1210A-1210F throughout the store. For example, scanners 1210A-1210D may be installed in attended checkout lanes, while scanners 1210D-1210F may be installed at self-checkout stations. Of course, larger stores may have a large number of checkout options. These scanners 1210A-1210F may be coupled to common network 1250, which may be an internal network for the store. This connection to the store network may be facilitated via one of the ports of each of the multi-port network switches of the respective scanner 1210A-1210F as described above. Communicating with these scanners 1210A-1210F via network protocols may be desirable for various reasons, such as during configurations, updates, trouble shooting, etc.

A technician may have a device 1220 that can communicate with each scanner 1210A-1210F or other device on the network, but the technician may not know where the scanner is physically located. The user device 1220 may show the unique IDs (e.g., MAC address) for each scanner 1210A-1210F or other device and the user may select which scanner 1210A-1210F to send a message. The user device 1220 may send a locator message to one of the scanners 1210A-1210F or a group of scanners 1210A-1210F. For example, the user may select from the user device 1220 to locate first scanner 1210A based on its unique ID. The user, however, may not know the location of the first scanner 1210A.

In response to receiving the locator message, the first scanner 1210A may provide feedback to the user sufficient for the user to identify its location. In some embodiments, the feedback may be an audible feedback. For example, the first scanner 1210A may produce a beep or other sound. In some embodiments, the feedback may be or include visual feedback. For example, the first scanner 1210A may produce a visual response, such as via scanner illumination (e.g., 118, 128) indicating that the first scanner 1210A is the scanner with which communications are occurring. Initiating other related illumination, such as any illumination sources related to the TDR 152 or other connected devices, is also contemplated. Other visual feedback may be provided by a connected display (e.g., seven-segment display, connected POS display or visual feature, etc.), as described above. This feedback may assist the user in identifying that the first scanner 1210A (which communications are occurring) is the scanner physically located in assisted lane 1. Verifying physical location of the first scanner 1210A (and locations of other scanners) may assist the user in providing any needed updates, configurations, or troubleshooting. As different accessories (e.g., peripherals, TDR, internal cameras) or other network connected devices (e.g., POS, RFID reader, credit card reader, etc.) also include their own unique devices, physically locating and identifying these various devices may also be achieved through a location message being sent to prompt a response by the respective devices or by one of the connected devices (e.g., base scanner) at that location.

In some embodiments, the base scanner 810 is in control of determining what operational mode the multi-port network switch 140 is operating in (e.g., learning mode, locked mode, open mode, VLAN creation mode, etc.) In response to receiving the user input (e.g., reading a configuration barcode or other input as described herein), the base scanner 810 may transmit the appropriate command to the multi-port network switch 140 with instructions to perform such configurations. In some embodiments, the multi-port network switch 140 may store network information, such as what ports are active, what IDs (MAC addresses) are detected on each port, what VLAN or MAC restrictions each port has been set up with, etc. In some embodiments, the base scanner 810 may be configured to read and/or set this network information as needed. Thus, such network information may also be shared between the multi-port network switch 140 and the base scanner 810. For example, when a configuration barcode is read (or other input), the base scanner 810 may read the MAC table, ports, and other configuration information (e.g., VLANs, etc.) as needed to modify and match the desired outcome associated with a particular configuration barcode.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner, comprising:
   a housing;
   a base scanner including one or more internal camera modules and a main board including one or more processors disposed within the housing;
   one or more scanner accessories; and a multi-port network switch operably coupled with the base scanner and the one or more scanner accessories, wherein the multi-port network switch is configured to configure access to the network responsive to a user input received by at least one of the base scanner or the one or more scanner accessories, wherein the base scanner is configured to read a configuration barcode and instruct the multi-port network switch to lock access to each port on a per port basis based on detecting unique identifiers of each individual device currently connected to the multi-port network switch at its respective port during a learning phase.

2. The fixed retail scanner of claim 1, wherein the one or more scanner accessories include one or more of:

a top-down reader mechanically coupled to an external portion of the housing;

a peripheral camera positioned remotely from an external portion of the housing; or a color camera modules disposed within the housing.

3. The fixed retail scanner of claim 1, wherein the main board and the one or more internal camera modules are network connected devices operably coupled to different ports of the multi-port network switch.

4. The fixed retail scanner of claim 1, wherein the multi-port network switch is configured to deny access to the network responsive to detecting a device having a unique identifier that differs from an expected unique identifier for the respective port at the time the multi-port network switch was locked during the learning phase.

5. The fixed retail scanner of claim 1, wherein at least one of the multi-port network switch and the base scanner is configured to:

detect a scanner accessory has been disconnected from its port after the multi-port network switch was locked and detect a device is connected to the port; and deny access to the network if the device does not recognize an encryption certificate.

6. The fixed retail scanner of claim 1, wherein at least one of the multi-port network switch and the base scanner is configured to:

detect a scanner accessory has been disconnected from its port after the multi-port network switch was locked and detect a device is connected to the port; and generate an alert to store personnel and deny access to the network from the port until cleared by the store personnel.

7. The fixed retail scanner of claim 1, wherein the base scanner is configured to reopen the learning phase to reconfigure the devices and lock access to a different set of devices on a per port basis.

8. The fixed retail scanner of claim 1, wherein the base scanner is configured to allow access to a first device at a first port of the multi-port network switch as a result of being connected during the learning phase, and deny access to the first device at a second port of the multi-port network switch after the learning phase even though the first device is permitted access to the first port based on its unique ID.

9. The fixed retail scanner of claim 1, wherein the base scanner is configured to allow access to a first device at a first port of the multi-port network switch as a result of being connected during the learning phase, and deny access to a second device at a second port of the multi-port network switch after the learning phase even though the second device has a spoofed unique ID that would otherwise be permitted access to the first port.

10. The fixed retail scanner of claim 1, wherein the base scanner is configured to allow access to a first device at a first port of the multi-port network switch as a result of being connected during the learning phase, and deny access to a second device at the first port of the multi-port network switch after the learning phase even though the second device has a spoofed unique ID that would otherwise be permitted access to the first port wherein the base scanner is configured to detect the second device is different than the first device based on detecting behavioral differences that are different than expected for the first device.

11. A fixed retail scanner comprising:

a housing;

a base scanner including one or more internal camera modules and a main board including one or more processors disposed within the housing;

one or more scanner accessories; and a multi-port network switch operably coupled with the base scanner and the one or more scanner accessories, wherein the multi-port network switch is configured to configure access to the network responsive to a user input received by at least one of the base scanner or the one or more scanner accessories, wherein the base scanner is configured to read a configuration barcode and instruct the multi-port network switch to create one or more virtual local area networks (VLANs) in response thereto.

12. The fixed retail scanner of claim 11, wherein creating the one or more VLANs is a dynamic process that defines ports used for each VLAN based on user interaction after connecting devices in different groups to the multi-port network switch.

13. A fixed retail scanner comprising:

a housing;

a base scanner including one or more internal camera modules and a main board including one or more processors disposed within the housing;

one or more scanner accessories; and a multi-port network switch operably coupled with the base scanner and the one or more scanner accessories, wherein the multi-port network switch is configured to configure access to the network responsive to a user input received by at least one of the base scanner or the one or more scanner accessories, wherein at least one of the base scanner or the one or more scanner accessories is configured to provide feedback to a user in response to a locator request generated by the user's device connected to a common network as the multi-port network switch.

14. A method for configuring network access to a fixed retail scanner, the method comprising:

connecting a base scanner to a multi-port network switch disposed within a common housing of the fixed retail scanner;

connecting one or more scanner accessories to the multi-port network switch;

receiving a user input via at least one of the base scanner or the one or more scanner accessories; and configuring the multi-port network switch to manage access to the network for communication through the multi-port network switch responsive to the user input, wherein configuring the multi-port network to manage access to the network includes creating one or more virtual local area networks (VLANs) responsive to the user input.

15. The method of claim 14, wherein the receiving the user input includes decoding a configuration barcode to initiate the configuring of the multi-port network switch.

16. The method of claim 14, wherein configuring the multi-port network to manage access to the network includes assigning unique identifiers of each connected device to its respective port of the multi-port network switch, and locking the ports such that devices having unassigned unique identifiers for the port are denied access to the network.

17. The method of claim 14, wherein the base scanner is configured to provide feedback to the user indicative of each grouping of ports for the VLANs created.

18. The method of claim 17, wherein the feedback is one of a visual or an audible feedback generated by the base scanner responsive to a second user input.

19. The method of claim 14, wherein creating one or more VLANs includes:

detecting a first group of devices connected to the multi-port network switch at a first time;

creating a first VLAN to include the first group of devices;

detecting a second group of devices a second, different group of devices connected to the multi-port network switch at a second time;

distinguishing the second group from the first group; and creating a second VLAN to include the second group of devices.

20. The method of claim 14, further comprising connecting at least one device to the multi-port network switch that is not associated with a scanning process, wherein a first VLAN includes the base scanner and the one or more scanning accessories, and a second VLAN includes the at least one device that is not associated with the scanning process.

* * * * *